United States Patent Office 2,943,128
Patented June 28, 1960

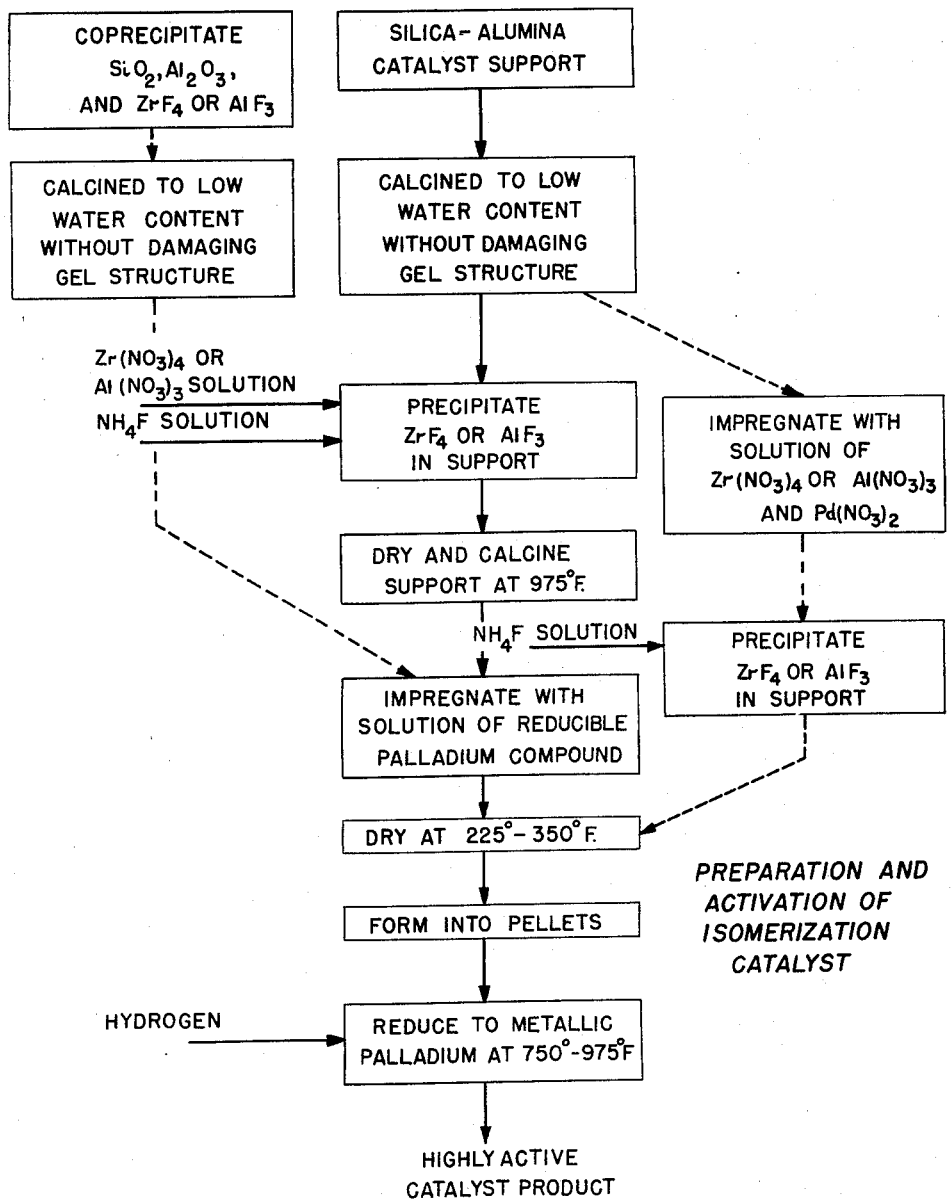

2,943,128

PROCESS AND CATALYST FOR ISOMERIZING NORMAL PARAFFINS

Hillis O. Folkins, Crystal Lake, Elmer L. Miller, Cary, and Kenneth E. Lucas, Crystal Lake, Ill., assignors to The Pure Oil Company, Chicago, Ill., a corporation of Ohio Filed Oct. 6, 1958, Ser. No. 765,482

12 Claims. (Cl. 260—683.68)

This invention relates to new and useful improvements in processes for the hydroisomerization of normal paraffin hydrocarbons having 4 to 7 carbon atoms per molecule, and more particularly to an improved isomerization catalyst and method of preparing the same.

It has been found that the hydroisomerization of hydrocarbon feed stocks consisting predominantly of normal paraffin hydrocarbons having 4 to 7 carbon atoms per molecule can be efficiently carried out by passing the feed stock over a catalyst under moderate temperature isomerization conditions. When paraffin hydrocarbons are isomerized in this manner, a mixture of hydrogen and the hydrocarbon in a hydrogen/hydrocarbon mol ratio in the range of about 0.5–5.0, is passed over a composite catalyst at a pressure within the range of about 100–1000 p.s.i.g., and a temperature within the range of about 650°–800° F. The most effective composite catalyst for the isomerization of normal paraffin hydrocarbons under the conditions just described consists of an acidic silica-alumina support having deposited thereon from 0.01 to 1.0 wt. percent of palladium. In accordance with this invention, it has been found that the incorporation of 0.5–10.0 wt. percent (preferably about 1.0–5.0%) of certain metallic fluorides in the catalyst support produces an isomerization catalyst having superior isomerization activity.

It is therefore one object of this invention to provide an improved process for the preparation of a highly active isomerization catalyst.

Another object of this invention is to provide a highly active isomerization catalyst capable of effecting the isomerization of low-molecular-weight normal paraffins to isoparaffins in high yield.

Another object of this invention is to provide an improved process for the isomerization of hydrocarbon feed stocks consisting predominantly of low-molecular-weight normal paraffins.

A feature of this invention is the provision of a process for the preparation of a highly active isomerization catalyst in which aluminum and/or zirconium fluoride is incorporated into a silica-alumina support and the support impregnated with a solution of a reducible palladium compound and reduced with hydrogen at elevated temperatures to produce a highly active catalyst.

Another feature of this invention is the provision of an improved isomerization catalyst consisting of a silica-alumina support, containing 50–95% silica, impregnated with 0.5–10.0 wt. percent aluminum and/or zirconium fluoride and 0.01–1.0 wt. percent palladium.

A further feature of this invention is the provision of an improved process for isomerization of normal paraffin hydrocarbons in which said hydrocarbons are passed with hydrogen at an elevated pressure and a temperature in the range of about 650°–800° F. over the improved catalyst of this invention.

Other objects and features of this invention will become apparent from time to time throughout the specification and claims as hereinafter related.

In the accompanying drawing, there is shown a flow diagram of a preferred embodiment and two alternate embodiments of our improved method of preparing isomerization catalysts.

According to this invention, it has been found that the effectiveness of a palladium-promoted, silica-alumina composite isomerization catalyst can be enhanced by impregnating the silica-alumina support with 0.5–10.0 wt. percent of aluminum and/or zirconium fluoride, either prior to or concomitantly with the deposition of palladium thereon. In the preparation of a catalyst composition in accordance with this invention, the palladium metal is incorporated in the silica-alumina support by impregnation of the support with a solution of a reducible palladium salt, such as the chloride or nitrate, or with a solution of a mixed palladium salt, such as ammonium chloropalladite. The preparation of the catalyst has been generally carried out by impregnating a support with an aqueous solution of palladium chloride, sometimes containing small amounts of an inorganic acid such as hydrochloric acid. In our process, for example, a catalyst support, consisting of silica-alumina containing 50–95 wt. percent silica, is impregnated with a solution of an aluminum salt, such as aluminum nitrate, and reacted with a solution of a fluoride salt, such as ammonium fluoride to precipitate aluminum fluoride within the support. The impregnated support is then dried and calcined at 975° F. for a short period of time. The support is then impregnated with a solution of a reducible palladium salt, such as palladium chloride or palladium nitrate. The impregnated catalyst is dried and formed into pellets by a suitable pelleting machine or may be extruded and cut into pellets, if desired. If the catalyst is to be extruded, it is necessary that the catalyst support never be dried to a water content less than about 20% prior to impregnation with the palladium salt solution and that the impregnated catalyst contain about 50–65 wt. percent of water at the time of extrusion. After extrusion the catalyst is dried at about 225°–350° F. The catalyst pellets or extrudate are activated by reduction with hydrogen at a temperature of about 750° to 975° F. The catalyst thus produced has a concentration of palladium metal thereon which is determined by the concentration of the solution of palladium salt used to impregnate the catalyst support.

As an alternative method of preparing the catalyst, the metal fluoride and palladium impregnation may be combined. In this method, the palladium salt is introduced in solution containing the desired amount of aluminum or zirconium in the form of a water-soluble salt. The impregnated catalyst support is then treated with a solution of a fluoride salt, such as ammonium fluoride, to precipitate aluminum or zirconium fluoride throughout the support. Then the support is dried at 225°–350° F., formed into pellets, and reduced with hydrogen at 750°–975° F., as in the preferred method.

As still another alternative method of preparing the catalyst, the aluminum or zirconium fluoride may be coprecipitated with the silica and alumina in the original preparation of the support. In such a method, silica, alumina, and aluminum or zirconium fluoride, in the desired proportions, are coprecipitated using conventional precipitation techniques. The resulting gel is calcined to a low water content without damaging the gel structure and is impregnated with a solution of a reducible palladium compound, dried, formed into pellets, and reduced with hydrogen, as in the other embodiments of the invention.

The following non-limiting examples illustrate the preparation of palladium-containing isomerization catalysts, and a comparison of the catalyst prepared in accordance with this invention with other palladium-containing catalysts in the hydro-isomerization of low-molecular-weight normal paraffin hydrocarbons.

EXAMPLE I

A commercial silica-alumina cracking catalyst, containing 87% silica and 13% alumina, was dried at 400° F. for a period of 3 hours, to a water content of 3 wt. percent. A 250 g. portion of the catalyst support was then impregnated at 120° F. with 250 cc. of a 2% solution of hydrochloric acid containing sufficient palladium chloride to produce a concentration of 0.35 wt. percent palladium metal in the catalyst. The solution was completely absorbed in the pores of the catalyst support and converted the same to a smooth thick paste. The catalyst was dried at 230° F. for 16 hours, formed into pellets ⅛" in diameter, and activated by heating at 975° F. in a current of hydrogen for a period of 16 hours to reduce the palladium salt to metallic palladium in a highly active form. After reduction with hydrogen, the catalyst pellets contained 0.35 wt. percent palladium metal. The catalyst thus prepared was evaluated in the isomerization of n-pentane.

Hydrogen and n-pentane in a 1:1 mol ratio were circulated over the catalyst pellets at a temperature of 700° F., a pressure of 500 p.s.i.g., and a liquid volume hourly space velocity of 3.0. The liquid volume hourly space velocity is defined as the liquid volume of hydrocarbons fed per hour per unit volume of effective catalyst bed. Under the above reaction conditions, isopentane was obtained in a yield of 47.4%.

EXAMPLE II

In the preparation of a catalyst in accordance with a preferred embodiment of this invention, a commercial silica-alumina cracking catalyst, containing 87% silica and 13% alumina, that had been dehydrated to 3% water content, was redried at 400° F. This support was then impregnated with aluminum nitrate solution and aluminum fluoride was precipitated throughout the support by addition of aqueous ammonium fluoride. The resulting composition was dried and calcined for a short time at 975° F. This catalyst support was then impregnated with an aqueous solution containing 0.35 wt. percent palladium, as palladium nitrate, in an amount sufficient to fill the pores of the catalyst support. The impregnated catalyst mass was dried at 230° F. for 16 hours, formed into pellets ⅛" in diameter, and activated by heating at 975° F. in a current of hydrogen for a period of 16 hours to reduce the palladium salt to metallic palladium in a highly active form. After reduction with hydrogen, the catalyst pellets contained 2% aluminum fluoride and 0.35% palladium metal. The catalyst thus prepared was evaluated in the isomerization of n-pentane.

Hydrogen and n-pentane in a 1:1 mol ratio were circulated over the catalyst pellets at a temperature at 700° F., a pressure of 500 p.s.i.g., and a liquid volume hourly space velocity of 3.0. Under these reaction conditions, isopentane was obtained in a yield of 57.6%

EXAMPLE III

In the preparation of a catalyst in accordance with a preferred embodiment of this invention, a commercial silica-alumina cracking catalyst, containing 87% silica and 13% alumina, that had been dehydrated to 3% water content, was redried at 400° F. This support was then impregnated with zirconium nitrate solution, and zirconium fluoride was precipitated throughout the support by addition of aqueous ammonium fluoride. The resulting composition was then dried and calcined for a short time at 975° F. This catalyst support was then impregnated with an aqueous solution containing 0.35 wt. percent palladium, as palladium nitrate, in an amount sufficient to fill the pores of the catalyst support. The impregnated catalyst mass was dried at 230° F. for 16 hours, formed into pellets ⅛" in diameter, and activated by heating at 975° F. in a current of hydrogen for a period of 16 hours to reduce the palladium salt to metallic palladium in a highly active form. After reduction with hydrogen, the catalyst pellets contained 2% zirconium fluoride and 0.35% palladium metal. The catalyst thus prepared was evaluated in the isomerization of n-pentane.

Hydrogen and n-pentane in a 1:1 mol ratio were circulated over the catalyst pellets at a temperature at 700° F., a pressure of 500 p.s.i.g., and a liquid volume hourly space velocity of 3.0. Under these reaction conditions, isopentane was obtained in a yield of 53.5%.

EXAMPLE IV

In other experiments, the procedure of Example II was repeated except that calcium nitrate, manganese nitrate, thorium nitrate and cerium nitrate, respectively, were substituted in the impregnation step, so that the catalyst support was impregnated with calcium fluoride in one experiment, and manganese fluoride, thorium fluoride and cerium fluoride in other experiments. Each of these fluorided catalyst supports was impregnated with an aqueous solution of palladium nitrate, dried, pelleted, and activated by reduction with hydrogen at 975° F. After reduction with hydrogen, the first catalyst consisted of a silica-alumina support, containing 87% silica and 13% alumina, impregnated with 2% calcium fluoride and 0.35% palladium metal. The second catalyst consisted of a silica-alumina support, containing 87% silica and 13% alumina, impregnated with 2% manganese fluoride and 0.35 palladium metal. The third catalyst contained 0.35% palladium and 2% thorium fluoride. The fourth catalyst contained 0.35% palladium and 2% cerium fluoride. These catalysts were evaluated in the isomerization of n-pentane as follows.

Hydrogen and n-pentane in a 1:1 mol ratio were circulated over the respective catalyst pellets at a temperature of 700° F., a pressure of 500 p.s.i.g., and a liquid volume hourly space velocity of 3.0. Under these reaction conditions, isopentane was obtained in a yield of 42.9% with the catalyst containing 2% calcium fluoride, a yield of 41.6% with the catalyst containing 2% manganese fluoride, a yield of 39.7% with the catalyst containing 2% thorium fluoride, and a yield of 37.6% with the catalyst containing 2% cerium fluoride.

From the above examples, it is seen that the incorporation of just any fluoride-containing compound in a silica-alumina catalyst support is not effective in enhancing the catalyst activity. From the above examples, it is seen that manganese fluoride, thorium fluoride, cerium fluoride and calcium fluoride result in a deterioration of catalyst activity while aluminum or zirconium fluoride enhances very substantially the activity of a palladium on silica-alumina catalyst.

In Table I the activity of 87/13 silica-alumina catalysts are compared, with and without the palladium metal promoter, and with and without additional metal fluorides. The comparison of these catalysts was made in

*Table I*

ISOMERIZATION ACTIVITY OF CATALYSTS

| Catalyst | | | | Isopentane Yield, percent W. |
|---|---|---|---|---|
| Support Composition, percent W. | | Pd, percent W. | Fluoride, 2 percent W. | |
| $SiO_2$ | $Al_2O_3$ | | | |
| 87 | 13 | 0.35 | $AlF_3$ | 57.6 |
| 87 | 13 | 0.35 | $ZrF_4$ | 53.5 |
| 87 | 13 | 0.35 | none | 47.4 |
| 87 | 13 | 0.35 | $CaF_2$ | 42.9 |
| 87 | 13 | 0.35 | $MnF_2$ | 41.6 |
| 87 | 13 | 0.35 | $ThF_4$ | 39.7 |
| 87 | 13 | 0.35 | $CeF_3$ | 37.6 |
| 87 | 13 | none | $AlF_3$ | 4.4 |
| 87 | 13 | none | none | 2.0 | the isomerization of n-pentane at 700° F., liquid volume hourly space velocity of 3.0, hydrogen pressure of 500 p.s.i.g., hydrogen/hydrocarbon mol ratio of 1.0, and shows the isopentane yield for each catalyst.

While the process has been described with special emphasis upon the precipitation of a metal fluoride in a preformed catalyst support, it should be understood that these fluorides may be incorporated in the catalyst support in other ways. They may be coprecipitated with the silica and alumina in the original gel from which the support is formed. The metal fluoride may also be introduced into the support in the form of a soluble metal salt in the same solution with the palladium salt used in impregnating the catalyst. The impregnated support is then treated with ammonium fluoride to precipitate the metal fluoride therein. Using any of these techniques, the catalyst which is impregnated with 0.5–10% aluminum or zirconium fluoride (and preferably 1.0–5%) has a substantially higher activity than a catalyst which is prepared without using any fluoride.

While any of a variety of impregnation techniques may be used in preparing a fluorided catalyst, it should be noted that some form of impregnation from solution must be used to realize the improved catalytic activity. If dry aluminum fluoride or zirconium fluoride is powdered and physically mixed with the silica-alumina support the improvement in catalytic activity is not obtained. Similarly, the metal fluoride cannot be slurried and mixed with the support if an improved catalyst is to be produced. In one experiment, aluminum fluoride was precipitated as a gel from aqueous solution and thoroughly mixed with a silica-alumina catalyst support. The mixture was filtered, dried, and impregnated with palladium nitrate. Then the catalyst was dried, pelleted, and reduced with hydrogen at 975° F. The catalyst contained 2% aluminum fluoride and 0.35% palladium. The improvement in isomerization yield with this catalyst (over the metal-promoted catalyst containing no metal fluoride) was only about half that obtained when the support was impregnated with the aluminum fluoride.

The operating conditions for isomerization of normal paraffin hydrocarbons using the highly active catalyst of this invention are normally selected so that degeneration or fouling of the catalyst does not occur. These catalysts are much more sensitive to temperature changes than catalysts which have not been provided with small amounts of aluminum or zirconium fluoride precipitated within the support. Thus, it is necessary to maintain the isomerization reaction temperature within a relatively narrow range. The optimum reaction temperature range is 700°–740° F., while the range from 650°–800° F. represents the extreme temperature limits for use of these catalysts. The catalyst may become fouled after extremely long periods of use or as a result of unusual variations in temperatures or hydrocarbon/hydrogen ratio, and thus may require reactivation or regeneration at intervals of once or twice a year. The regeneration procedure which is followed is one in which the catalyst is oxidized to eliminate carbon deposits and then reduced with hydrogen. The oxidation and reduction temperatures used are such that the catalyst is not subjected to sintering and the activity of the catalyst thus remains high. The catalyst is oxidized using air or oxygen at a temperature in the range from about 700°–950° F. The catalyst is most effectively regenerated if it is subjected to air at a pressure of 70–130 p.s.i.g. for a period of 2 to 8 hours, at a temperature of 800°–875° F. The oxidized catalyst is then reduced and reactivated by treatment with hydrogen at a temperature in the range from about 750°–950° F. If the optimum conditions of oxidation and reduction of the catalysts are used, the catalyst is regenerated and reactivated to an isomerization activity substantially the same as that of an activated virgin isomerization catalyst of the same composition.

In isomerizing normal paraffin hydrocarbons containing 4 to 7 carbon atoms per molecule, in accordance with this invention, the catalyst used is prepared by treating a silica-alumina support with a solution containing an aluminum or zirconium salt, either prior to or concomitantly with the impregnation of the silica-alumina support with a palladium-containing solution. The support is then treated with ammonium fluoride to convert the metal salt into the fluoride which is precipitated uniformly throughout the upport. The silica-alumina support which is used must be of an acidic nature and must contain from 50–95% silica, with 70–90% silica being preferred. Under the conditions of isomerization used in this process, the catalyst supported on pure silica or pure alumina has substantially lower activity. Thus, a catalyst consisting of 0.4 wt. percent platinum on alumina will produce a yield of isopentane of only about 15% under the conditions used in the various examples of this specification. Platinum on silica is equally ineffective. The catalyst support of this invention is preferably impregnated with 0.5–10.0 wt. percent aluminum or zirconium fluoride and 0.01 to 1.0% palladium, with a concentration of 0.1–0.8% being preferred.

In the isomerization of different $C_4$–$C_7$ normal paraffin hydrocarbons, the optimum isomerization conditions are different for different hydrocarbons as shown in Table II.

*Table II*

OPTIMUM CONDITIONS FOR ISOMERIZATION OF $C_4$-$C_7$ NORMAL PARAFFIN HYDROCARBONS

| Temp., ° F. | Range | Preferred Range |
|---|---|---|
| n-$C_4$ | 700–800 | 725–800 |
| n-$C_5$ | 675–775 | 700–740 |
| n-$C_6$ | 650–740 | 675–725 |
| n-$C_7$ | 600–725 | 625–700 |
| Pressure, p.s.i.g. | 100–1,000 | 350–750 |
| Liquid volume hourly space velocity | 0.5–25 | 2–10 |
| $H_2$/Hydrocarbon mol ratio | 0.5–5.0 | 1.5–4.5 |

It is apparent that when mixed feed stocks are employed, a compromise must be effected in selecting the temperature which is to be used in order to produce optimum activity and selectivity for the desired isoparaffins without producing substantial amounts of hydrocracking as a concomitant undesirable side reaction. The optimum temperature is one which in most cases must be determined experimentally in accordance with the relative proportions of hydrocarbons in the feed. The maximum efficiency for isomerization of the various $C_4$–$C_7$ hydrocarbons is obtained by passing the hydrocarbon feed through a suitable fractionation system to separate the individual hydrocarbons for isomerization under optimum conditions for each hydrocarbon. The products of each isomerization may then be recombined into a single product.

While we have described our invention fully and completely as required by the patent statutes, with special emphasis upon one or more preferred embodiments, we wish it understood that within the scope of the appended claims, this invention may be practiced otherwise than as specifically described.

What is claimed is:

1. The method of preparing a hydrocarbon isomerization catalyst which comprises precipitating 0.5–10.0 wt. percent of a metal fluoride selected from the group consisting of aluminum fluoride and zirconium fluoride within a silica-alumina catalyst support, containing 50–95 wt. percent silica, impregnating the catalyst support with a solution of a reducible palladium compound, drying the impregnated catalyst support, and reducing the catalyst with hydrogen at 750°–975° F.

2. A method in accordance with claim 1 in which the palladium compound solution is of a concentration and amount sufficient to produce a palladium concentration of 0.01–1.0 wt. percent on the catalyst.

3. A method in accordance with claim 2 in which the catalyst is formed into pellets after drying.

4. A method in accordance with claim 1 in which a silica-alumina catalyst support, containing 50-95 wt. percent silica, is impregnated with a solution of a soluble aluminum salt and reacted with a fluoride salt to precipitate aluminum fluoride uniformly within the catalyst support, and the impregnated support is then dried and calcined prior to impregnation with the palladium compound solution.

5. A method in accordance with claim 1 in which a silica-alumina catalyst support, containing 50-95 wt. percent silica, is impregnated with a solution of a soluble zirconium salt and reacted with a fluoride salt to precipitate zirconium fluoride uniformly within the catalyst support, and the impregnated support is then dried and calcined prior to impregnation with the palladium compound solution.

6. A hydrocarbon isomerization catalyst consisting essentially of a silica-alumina catalyst support, containing 50-95 wt. percent silica, 0.5-10.0 wt. percent aluminum fluoride precipitated within the support, and 0.01-1.0 wt. percent palladium deposited on the support as an aqueous solution of a reducible palladium compound and converted to palladium metal in a highly active form by reduction with hydrogen at 750°-975° F.

7. A hydrocarbon isomerization catalyst consisting essentially of a silica-alumina catalyst support, containing 50-95 wt. percent silica, 0.5-10.0 wt. percent zirconium fluoride precipicated within the support, and 0.01-1.0 wt. percent palladium deposited on the support as an aqueous solution of a reducible palladium compound and converted to palladium metal in a highly active form by reduction with hydrogen at 750°-975° F.

8. A method of isomerizing $C_4$-$C_7$ normal paraffin hydrocarbons which comprises passing hydrogen and a normal paraffin hydrocarbon at a temperature in the range of about 650°-800° F., sufficient to effect isomerization, a pressure of about 100-1000 p.s.i.g., a liquid volume hourly space velocity of 2.0-10.0, and a hydrogen/hydrocarbon mol ratio within the range of about 0.5-5.0, over a catalyst prepared and activated in accordance with claim 1.

9. A method of isomerizing $C_4$-$C_7$ normal paraffin hydrocarbon which comprises passing hydrogen and a normal paraffin hydrocarbon at a temperature in the range of about 650°-800° F., sufficient to effect isomerization, a pressure of about 100-1000 p.s.i.g., a liquid volume hourly space velocity of 2.0-10.0, and a hydrogen/hydrocarbon mol ratio within the range of about 0.5-5.0, over a catalyst prepared and activated in accordance with claim 4.

10. A method of isomerizing $C_4$-$C_7$ normal paraffin hydrocarbons which comprises passing hydrogen and a normal paraffin hydrocarbon at a temperature in the range of about 650°-800° F., sufficient to effect isomerization, a pressure of about 100-1000 p.s.i.g., a liquid volume hourly space velocity of 2.0-10.0, and a hydrogen/hydrocarbon mol ratio within the range of about 0.5-5.0, over a catalyst prepared and activated in accordance with claim 5.

11. A method of isomerizing $C_4$-$C_7$ normal paraffin hydrocarbons which comprises passing hydrogen and a normal paraffin hydrocarbon at a temperature in the range of about 650°-800° F., sufficient to effect isomerization, a pressure of about 100-1000 p.s.i.g., a liquid volume hourly space velocity of 2.0-10.0, and a hydrogen/hydrocarbon mol ratio within the range of about 0.5-5.0, over a catalyst prepared and activated in accordance with claim 6.

12. A method of isomerizing $C_4$-$C_7$ normal paraffin hydrocarbons which comprises passing hydrogen and a normal paraffin hydrocarbon at a temperature in the range of about 650°-800° F., sufficient to effect isomerization, a pressure of about 100-1000 p.s.i.g., a liquid volume hourly space velocity of 2.0-10.0, and a hydrogen/hydrocarbon mol ratio within the range of about 0.5-5.0, over a catalyst prepared and activated in accordance with claim 7.

References Cited in the file of this patent

UNITED STATES PATENTS

| | | |
|---|---|---|
| 2,310,278 | Connolly | Feb. 9, 1943 |
| 2,550,531 | Ciapetta | Apr. 24, 1951 |
| 2,623,860 | Haensel | Dec. 30, 1952 |
| 2,733,219 | Bloch | Jan. 31, 1956 |
| 2,834,823 | Patton et al. | May 13, 1958 |

FOREIGN PATENTS

| | | |
|---|---|---|
| 487,392 | Canada | Oct. 21, 1952 |